US005768349A

United States Patent [19]
Knuth et al.

[11] Patent Number: 5,768,349
[45] Date of Patent: *Jun. 16, 1998

[54] VOICE MAIL TELEPHONE ANSWERING DEVICE

[75] Inventors: Stephen B. Knuth, Mission Viejo; Sanford M. Brown, III, Carlsbad; Mark J. Karnowski, Huntington Beach, all of Calif.

[73] Assignee: Casio PhoneMate, Inc., Torrance, Calif.

[*] Notice: The term of this patent shall not extend beyond the expiration date of Pat. No. 5,400,393.

[21] Appl. No.: 616,437

[22] Filed: Mar. 15, 1996

[51] Int. Cl.[6] .................................................. H04M 1/64
[52] U.S. Cl. ........................... 379/88; 379/73; 379/85
[58] Field of Search ............................. 379/67, 88, 89, 379/73, 74, 85

[56] References Cited

U.S. PATENT DOCUMENTS

| | | | |
|---|---|---|---|
| 4,860,339 | 8/1989 | D'Agosto, III et al. | 379/67 |
| 4,939,771 | 7/1990 | Brown et al. | 379/67 |
| 4,951,307 | 8/1990 | Willard | 379/74 |
| 5,029,198 | 7/1991 | Walpole et al. | 379/88 |
| 5,034,975 | 7/1991 | Grimes | 379/67 |
| 5,153,905 | 10/1992 | Bergeron et al. | 379/89 |
| 5,163,082 | 11/1992 | Karnowski | 379/89 |
| 5,400,393 | 3/1995 | Knuth et al. | |
| 5,504,806 | 4/1996 | Kawakami | |
| 5,533,104 | 7/1996 | Weiss et al. | 379/70 |

FOREIGN PATENT DOCUMENTS

| | | |
|---|---|---|
| 2 254 986 | 10/1992 | United Kingdom . |
| 2 272 346 | 11/1994 | United Kingdom . |
| 94/27394 | 11/1994 | WIPO . |

*Primary Examiner*—Fan S. Tsang
*Attorney, Agent, or Firm*—Frishauf, Holtz, Goodman, Langer & Chick

[57] ABSTRACT

A digital telephone answering device (DTAD) that allows messages to be forwarded to certain internal mailboxes. Random access memory (RAM) is flexibly and dynamically controlled by a microprocessor or controller. Audio signals in the form of voice messages are digitized and stored in the RAM. Messages can be sorted and allocated to specific mailboxes and made retrievable by pressing a button assigned to that mailbox. Messages can also be moved or re-assigned from a common message area to a certain mailbox or mailboxes. Outgoing messages are also stored in RAM and can be of sufficient number to have an outgoing message correspond to each incoming message storage area. The normal message recording and message playback functions of the DTAD may be activated after the call has been answered on the receiving side. Memos can be appended to messages that have been moved or re-assigned from a common message area to a certain mailbox or mailboxes.

5 Claims, 10 Drawing Sheets

VOICE MAIL TELEPHONE ANSWERING DEVICE

CROSS REFERENCE TO RELATED APPLICATIONS

Reference is made to U.S. patent application Ser. No. 08/238,986 entitled Voice Mail Digital Telephone Answering Device, now U.S. Pat. No. 5,400,393, as a related application, the entire contents of which is incorporated herein by reference.

BACKGROUND OF THE INVENTION

1. Field of the Invention

This invention relates to telephone message recording devices, and more particularly to a telephone answering device that provides a number of message areas so that incoming telephone messages can be stored according to the person for whom the message is intended.

2. Description of the Related Art

With the advent of digital electronics, information storage and manipulation has become a more flexibly performed task. With respect to telephone answering devices (TADs), digitization and analog recovery of voice messages allows all the convenience of older, audio tape-based TADs with enhanced message manipulation capabilities derived from the digital storage of the voice message.

The management of memory in digital telephone answering devices is known in the art and has been set forth in detail in U.S. patent application Ser. No. 07/592,673 filed Oct. 4, 1990 entitled Memory Management Methods for a Digital Telephone Answering Device now U.S. Pat. No. 5,163,082 issued Nov. 10, 1992, which is incorporated herein by reference.

It is well-established in the art of telephone answering devices to have a pair of tapes to record and play back voice messages over the telephone. One tape is usually for a single outgoing message ("You have reached my answering machine. Please leave a message after the tone."). The other is for a plurality of incoming messages.

When tapes are used to record messages, the messages are typically fixed relative to each other. Usually, only record, playback, and erase functions can be performed on the messages. No shifting or moving of messages takes place or, if allowed, takes place only under elaborate and cumbersome circumstances. Such obstacles in manipulating messages are overcome by the use of random access memory (RAM) to store the voice messages.

When tapes are used to record incoming messages for more than one person, messages for one person can easily alternate or otherwise interleave with messages for another person. With tape based TADs, no means are present by which the messages for just one person can be retrieved while skipping those that have been left for another. A tape-based TAD must retrieve the messages serially and cannot easily skip over messages.

RAM is a very flexible form of digital memory that is increasingly becoming less expensive. With RAM, blocks of memory can be quickly shifted from one location in memory to another and otherwise manipulated. The limitations present in a serial form of data storage are overcome as any particular memory location in RAM is as equally accessible as any other. With tapes or other serial storage media, in order to get to a memory location at the end of the media, all memory locations preceding the end location must be bypassed in order to reach the end memory location.

In order to use RAM to store audio information, especially voice messages, the analog electrical signal representing the audio signal must be converted to a digital form. The voice signal is sampled by a digitizer which generates a number that represents the analog signal at the point it was sampled. By sampling the voice signal at high enough rates, the combined signal levels at each of the sampled points approximates the continuous analog signal originally present. While some of the voice signal is lost by the digitization and re-conversion process, on the whole the process is satisfactory.

Voice digitization and signal recovery are known in the art, as is the manipulation of RAM memory. However, the combination of these known arts have never been embodied in a telephone answering device as set forth herein.

Many systems allow partitioning of messages, but rely on the caller to enter a touch-tone code to access the desired mailbox. However, the caller is the least likely person to know how to direct the message to the appropriate mailbox. This requires the owner to leave lengthy instructions as to how the caller can direct his messages in the system's outgoing message. These instructions not only take time, but if a caller does not follow the instruction, the system breaks down and the call may be misplaced or lost.

OBJECTS AND SUMMARY OF THE INVENTION

It is an object of the present invention to provide voice mail means in a telephone answering device (TAD).

It is a further object of the present invention to provide a TAD that can be conveniently used by several people.

It is another object of the present invention to provide a TAD that can be activated conveniently although an incoming call has been answered by a person.

It is still a further object of the present invention to provide a TAD that has great flexibility in use, convenient and easy-to-use features, and that is relatively inexpensive for a household or small office.

It is still another object of the present invention to provide a cost effective voice mail system implemented on a single digital telephone answering device.

It is yet a further object of the present invention to provide each user of the voice mail system with a separate mailbox, each capable of storing private messages.

It is yet another object of the present invention to provide users with the ability to selectively access their private messages by pushing their respective mailbox buttons.

It is a further object of the present invention to provide the users with the ability to remotely access their private messages from the mailbox by entering a predetermined remote tone code.

It is another object of the present invention to permit the sorting of messages into one or more individual mailboxes from a central message stack.

It is still a further object of the present invention to permit the transfer of messages from one mailbox to another.

It is still another object of the present invention to provide for a system that is flexible enough to handle the storage and control of messages in a multi-user environment.

It is also an object of the present invention to permit the user to record a message either from the microphone or from a person on the telephone line by activating a TAKE MESSAGE function, whereupon the telephone answering device of this invention records the message and automatically disconnects the telephone line after the completion of the call.

It is another object of the present invention to permit the user to play the messages of a specific mailbox over the telephone line by activating a DELIVER MESSAGE function, whereupon the caller can listen to the message of the mailbox.

It is yet another object of the present invention to free the user from having to monitor the answering machine while it is recording a message for someone or delivering messages over the telephone line.

It is a further object of the present invention to permit the assignment of distinctive ring cadences and caller ID numbers to individual mailboxes so that the incoming messages can be stored directly into the appropriate mailbox.

It is still a further object of the present invention to allow a local user to record a memo for another user of a TAD and append that memo to a message that has been transferred from one mailbox to another.

A digital telephone answering device (DTAD) flexibly and dynamically allocates RAM memory to store incoming and outgoing messages. Mailboxes for individual use are dynamically allocated so that messages can be partitioned from other individuals' messages or messages stored in a common message area. Outgoing messages can be stored so that each mailbox has its own outgoing message, as does the general or common message area.

Messages can be manipulated by the DTAD so that they can be assigned to one or more individual mailboxes from the common storage area. Messages in either the common storage area or the individual mailboxes can be transmitted to a caller without interfering with normal operation of the DTAD. If a person answers the telephone and the caller wants to leave a message for another party who is absent, the DTAD can be activated so that the caller may record a message for the absent party while the answering party can safely hang up the telephone without breaking the connection.

Instead of requiring lengthy outgoing messages to describe the system's operation, the present invention allows several convenient and easily understood means for directing messages. If the caller presses a touch tone mailbox number, the message will be directed to the appropriate mailbox. If no code is pressed, the message goes to a common area. Upon playback, the user can manually sort the messages by pressing a button (or buttons) associated with the mailbox(es). If a message is assigned or transferred from the common message area or a mailbox to more than one other mailbox, each mailbox to which the message was transferred accesses and manipulates as if it were the only one doing so. As only one message is stored, multiple access to that message is controlled by pointers or the like to the message. Additionally, memos can be appended to messages that have been moved or re-assigned from the common message area to a certain mailbox or mailboxes.

If the user subscribes to a distinctive ring service, the mailbox can be chosen by the type of incoming ring. Also, if calls originate from a set of preprogrammed telephone numbers, they can be automatically routed to the appropriate mailbox using a caller ID feature.

The present invention also allows selective playback of recorded messages. Instead of requiring the playback of all recorded incoming messages, the present invention allows messages left for a single person to be selectively retrieved. This selective retrieval is possible even though messages for one person are interleaved and interwoven with messages for another person or persons.

A preferred form of the telephone answering device, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
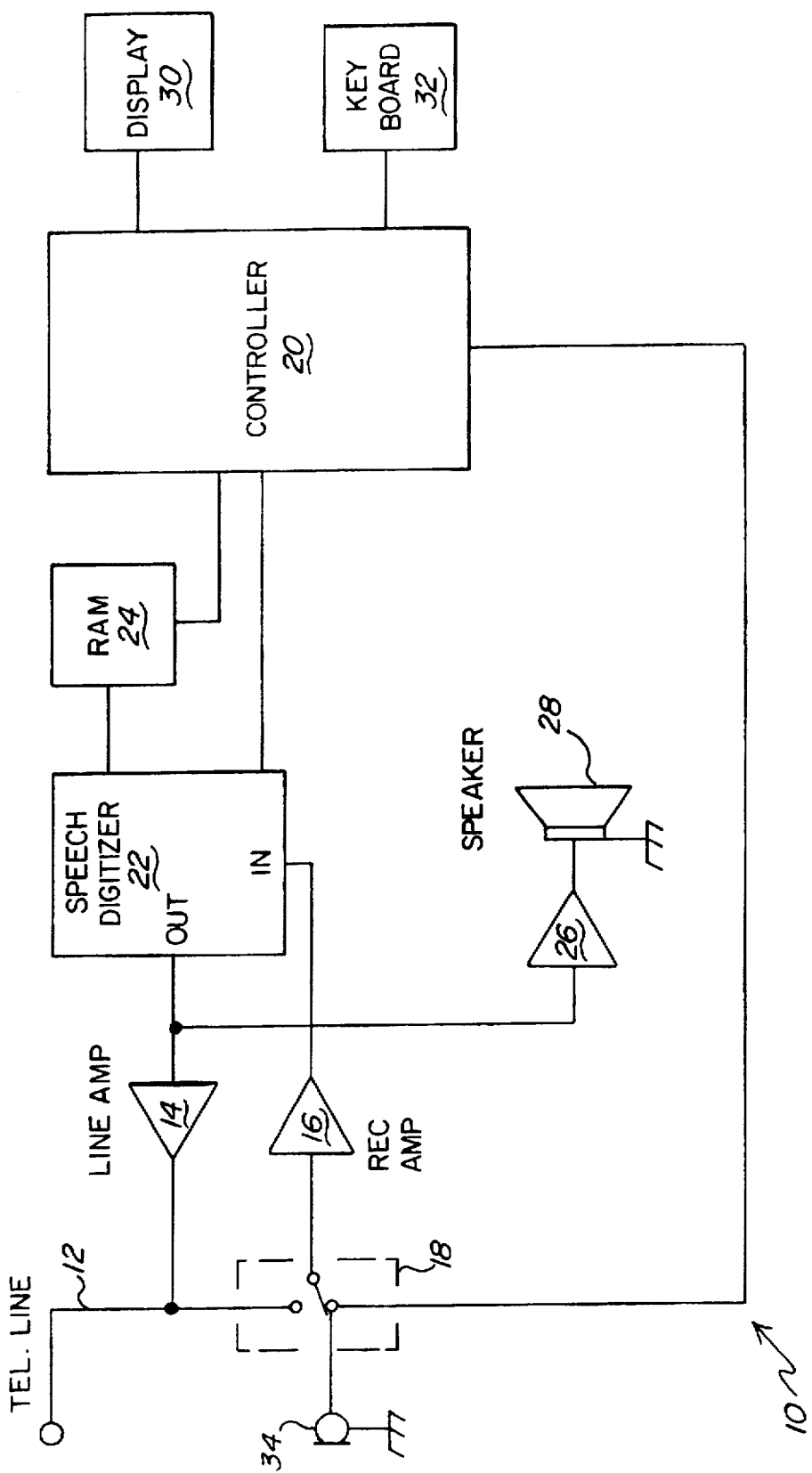
FIG. 1 is a diagrammatic plan view of the basic circuit elements of the digital telephone answering device (DTAD) of the present invention.

FIG. 1 shows a basic circuit diagram of the present invention.

The digital telephone answering device (DTAD) 10 is shown in FIG. 1. To those skilled in the art, the electronic architecture required for operation of the present invention will be understood by the inspection of FIG. 1. However, the brief explanation that follows provides a general description of the DTAD 10.

The DTAD 10 of the present invention is connected to the telephone line 12 and a source of power (not shown) such as a wall socket. The telephone line 12 is connected to the line amp 14 so that messages may be transmitted to the telephone line 12. The telephone line is also connected to the recording amp 16 through a switch 18 so that messages may be transmitted to the DTAD 10. The controller 20 operates the switch 18 so that the recording amp 16 may be selectably connected to the telephone line 12 or the built-in microphone 34 by the controller 20.

The output of the recording amp 16 is transmitted to the speech digitizer 22. The speech digitizer 22 is connected to and controlled by the controller 20. The speech digitizer 22 is also connected to RAM memory 24. The speech digitizer 22 records audio signals in the RAM 24 by digitizing analog audio signals passed to it by the recording amp 16. The speech digitizer is also able to convert and play back digital signals stored in the RAM 24. The output from the speech digitizer 22 is transmitted to the line amp 14 and a speaker amp 26. The output of the line amp 14 is sent to the telephone line while the output of the speaker amp 26 is sent to a speaker 28.

The controller 20 is connected to a display 30 that indicates the operating status of the DTAD 10. A keyboard 32 is connected to the controller 20 and allows a local user to control the operation of the DTAD 10 through keyboard input to the controller 20.

When an incoming call is detected by the DTAD 10, the controller 20 connects the recording amp 16 to the telephone line 12 through the switch 18. An outgoing message may be played to the caller that has been previously stored in RAM 24 and is played back to the caller through the speech digitizer 22 and the line amp 14. When the DTAD 10 is ready, the caller's message may be stored in RAM 24 through the recording amp 16 and the speech digitizer 22.

When a user wants to retrieve a message left by a caller on the DTAD 10, the user may use the keyboard 32 to activate the DTAD 10 and to direct the controller 20 to play back a recorded caller message. The presence of caller messages is indicated by the display 30. The caller message is retrieved from RAM 24 and converted to an audio signal by the speech digitizer 22. The audio signal is transmitted to the user through the speaker 28.

Figure 2:
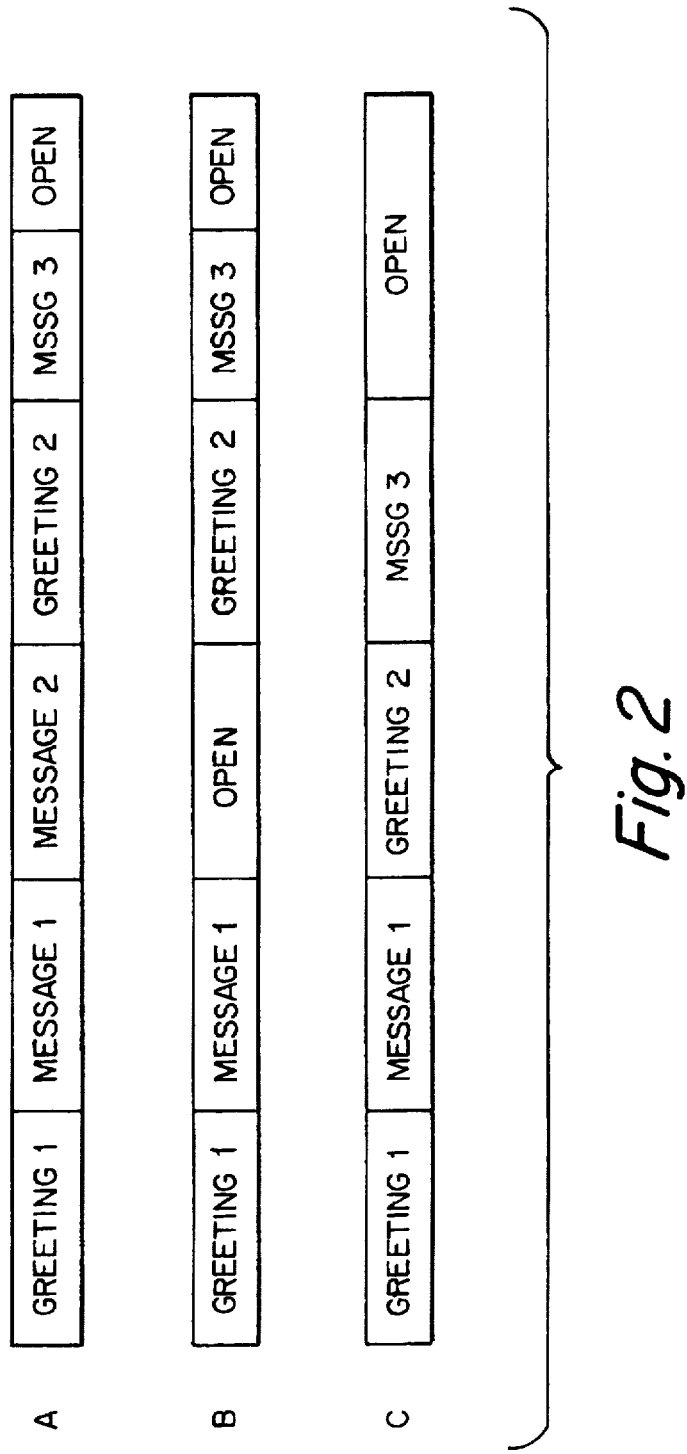
FIG. 2 is a diagrammatic plan view of memory space used by the DTAD of the present invention.

FIG. 2 shows by example how memory may be manipulated within the RAM memory of the present invention. As for the space marked "OPEN" in FIG. 2, other regions of memory can be shifted and moved in order to configure the information stored in memory as desired. Similarly, pointers to messages and other stored information of interest can be used in the present invention and can be sorted, shifted, and moved in much the same way as the messages stored in memory. In section A of FIG. 2, three messages are shown as being stored in RAM 24. Section B of FIG. 2 shows the memory condition when Message 2 is deleted (see "open" space after Message 1). Section C of FIG. 2 shows reallocation of the memory space to eliminate intermediate "open" spaces in the memory.

Generally, one portion or space in memory is the same as any other. Typically, memory is partitioned into portions or chunks for easier manipulation and management. While these memory chunks can be allocated in a static and unchanging manner, the size of the chunks can also be dynamically allocated so that no empty memory is left unoccupied by data or information that does not fill up an entire chunk.

Both the chunks or blocks of memory filled with information and those blocks of memory that are empty must be kept track of by the controller 20 or other device. In order to efficiently follow a dynamically changing internal partition structure to a block of memory, pointers may be used. A pointer is a location in memory that can be associated with a certain block or chunk of memory. For example, if a message has been stored in memory at hexadecimal address 2A4E, the pointer value is also 2A4E. If the message is to be moved to another location in memory, an empty or available chunk of memory is determined by referring to the pointer list. The message formerly at memory address 2A4E can then be moved to another location in memory by copying the information of the message to the new location and deleting the message at the old location. If the address of the new memory location for the message is 25BD, the pointer is updated to contain 25BD. When the message is to be retrieved, reference is made to the pointer list, the pointer for the message reflects the starting address of the message (25BD), and the information stored in memory starting at that address is retrieved to retrieve the message.

Figure 3:
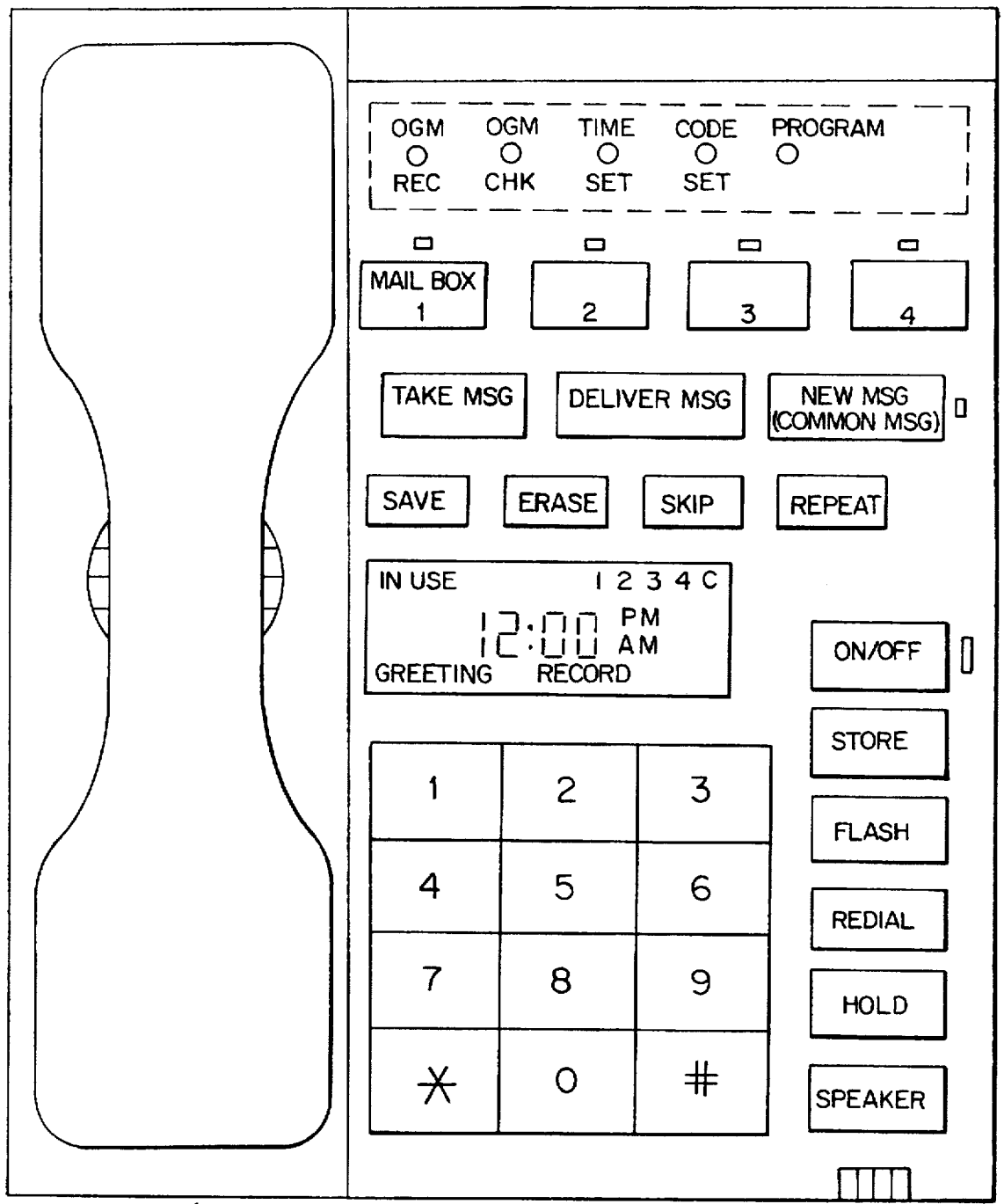
FIG. 3 is a plan view of a keyboard that could be used in conjunction with the present invention.

FIG. 3 shows an exemplary DTAD 10 keyboard with telephone handset and cradle. As set forth below, the features of the present invention may be exercised by pressing the appropriate buttons or keys on the keyboard in order to control the operation of the DTAD 10.

Figure 4:
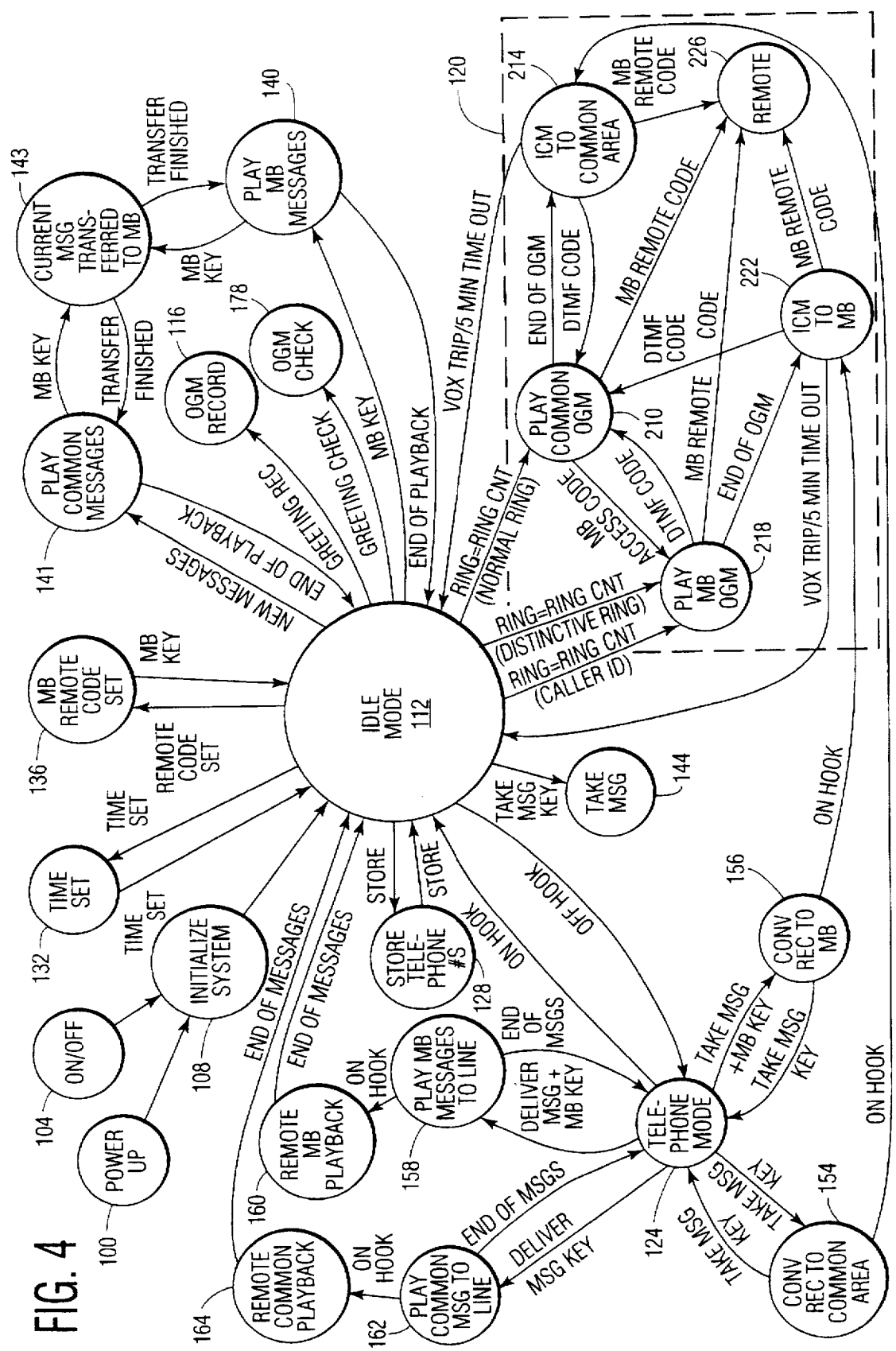
FIG. 4 is a state diagram for the operation of the present invention.

FIG. 4 shows a first state diagram of the present invention. The flexible and dynamic operation of the DTAD 10 is represented as existing in certain encircled states with operations or actions performed either by a user or the DTAD 10 itself indicated by lines connecting the various states.

The voice-mail telephone answering device (voice-mail TAD or TAD) 10 of the present invention is initialized when either the unit is plugged in and powered up 100 or when the on/off switch is turned on 104. After initialization 108, the DTAD 10 goes into idle mode 112. Idle mode 112 is the predominant mode of the DTAD 10 as the DTAD 10 is often inactive but ready to operate.

From the idle mode 112, access and entry into the various other modes of the DTAD 10 are available. These various other modes include: outgoing message (OGM) recording 116, message record and remote retrieve function 120, and telephone operation 124. A number of other modes are also accessible from the idle mode 112. These modes include: telephone number storage 128, time set 132, remote tone code set 136, local individual mailbox message retrieval 140, common message retrieval 141, and take message mode 144.

Telephone number storage 128 is known in the art and can be accomplished by pressing the button or entering the code to which the telephone number will be assigned, dialing or pressing the telephone number, and exiting the storage function by pressing a key that ends the sequence or the button or code that corresponds to the new telephone number. Telephone number storage 128 is a convenient way to quickly dial a telephone number, especially when the number is one that is often dialed. The stored telephone number may be dialed by pressing the button or code that corresponds to the desired number. Sometimes a prefix or entry code is required to prepare the TAD for automatic telephone number dialing.

The time may be set 132 on the DTAD 10. The time is then maintained by a clock. The use of electronic clocks such as the one used in the present invention is known in the art as is the setting and adjustment of such clocks. The time of day maintained by the clock may be coupled with the message recording capacity of the DTAD 10 so that recorded incoming messages (ICMs) are timestamped with the time of day.

The code set function 136 allows the owner/user of the DTAD 10 to uniquely set the remote tone code that allows dual-tone multi-frequency (DTMF) tones to remotely control the DTAD 10. Similar to the telephone number storage function 128, the remote code set function 136 may be indicated by the owner/user of the DTAD 10 by means of a button or prefix code. The desired remote code, usually something easy for the owner/user to remember, is then entered from the numeric telephone keypad. Exit from the remote code set function 136 may occur automatically, or may require a button to be pressed or an end code transmitted. Like the telephone number storage function 128 and the time set function 132, exit from the remote code set function 136 returns the DTAD 10 to the idle mode 112.

The remote code used to gain remote access to the functions and operations of the DTAD 10 is different than the access codes used to separately access the individual message storage areas of the DTAD 10. The remote code is contemplated as a three tone code that allows the user to remotely control the DTAD 10. The remote code is a security measure that prevents other people from altering the operation of the DTAD 10. The access codes are contemplated as a one tone code that allows the caller to direct messages to any of the message storage areas, either one or more of the mailboxes or the common message storage area.

Once messages have been recorded in the common message area, the common messages are played back 141 by pressing the NEW MESSAGES key. During the playback of the common messages, the user can transfer or assign the common messages to one or more of the mailboxes by pressing the particular mailbox key 143. If a mailbox key is pressed during the playback of a message from the common message areas, after playback, the message is no longer assigned to the common message area, but instead is accessed through the mailbox or mailboxes to which it is now assigned.

With the assignment of the same message to more than one mailbox, only one message is stored in memory. The pointer list is manipulated to allow each mailbox to operate independently of the message. For example, if a message is assigned or transferred to two different mailboxes, if one mailbox is instructed to delete the message, the pointer list will be updated to reflect the deletion of that message for that mailbox. The other mailbox can maintain its pointer to the message and the message will not be deleted for the second mailbox by the first.

Figure 5:
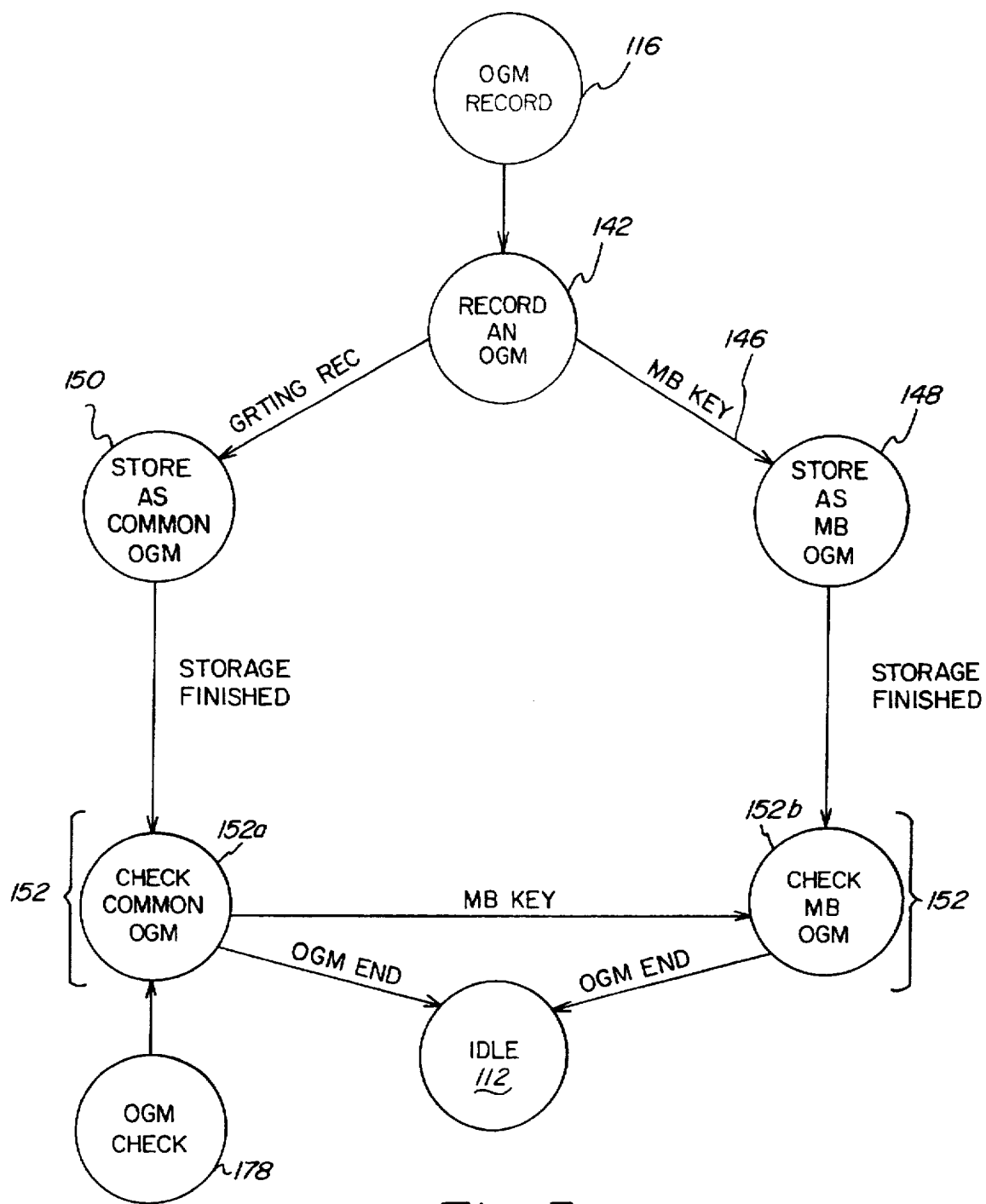
FIG. 5 is a state diagram for the outgoing message (OGM) recording operation of the present invention.

The outgoing message (OGM) record mode 116 is made up of several individual functions or steps. The state diagram for the OGM record mode is shown in FIG. 5. In order to initiate the OGM record mode 116, a greeting record initiation button or code sequence is pressed or performed. Upon initiation, the outgoing message is recorded 142 and then the specific mailbox may be selected 146 to which the message corresponds. The recorded message is from thereon designated as a mailbox message corresponding to a particular mailbox 148. Alternatively, the specific mailbox for which the outgoing greeting is to be recorded may be selected and then the corresponding message recorded.

If the recorded outgoing message is not associated with a specific mailbox, it becomes a common outgoing message that is played for all incoming calls 150.

Different outgoing messages can be played back according to the particular circumstances of the incoming call and/or the specific feature present in the DTAD 10. The DTAD 10 may discriminate incoming calls by the ring cadence (distinctive ring) and play an outgoing message to the caller according to the distinctive ring. Similarly, the DTAD 10 may detect the number from which the caller is conducting the telephone call by means of a "caller-id" function recently made available by some telephone utilities. For a distinctive ring or "caller-id" DTAD 10, an outgoing message appropriate for the caller can be played back instead of a more common outgoing message. Further, as corresponding OGMs can be played for specific ring sequences or "caller-id's, so too can certain mailbox storage areas be assigned to receive messages for certain distinctive rings and/or from certain telephone numbers.

If an outgoing message has already been recorded and assigned to a mailbox or as the common outgoing message, that outgoing message may be checked without going through the message recording function 116. An outgoing (OGM) message check function 178 allows the owner/user to check the presence and/or contents of the individual outgoing messages. After the certain outgoing message has been played, the DTAD 10 returns to its idle mode 112 to await further instructions or interrupts.

As there are four mailboxes in the present invention, four individual outgoing messages may be recorded with one message corresponding to each individual mailbox. In order to check the outgoing mailbox messages, or to find out what they are, a message check function 152 is provided so that the outgoing messages for each of the mailboxes can be heard and verified. Either the common outgoing message 152a or the outgoing messages for the mailboxes 152b can be checked. For the mailbox OGMs, after entry into the common message OGM check mode 152a, pressing the key for a certain mailbox activates the OGM check mode 152b for that particular mailbox. After any certain outgoing message is checked, the DTAD 10 returns to its idle mode 112.

When messages present in any one of the individual mailboxes are to be played back locally, the button or key for that particular mailbox is pressed. Upon the pressing of the individual mailbox's button, the messages assigned to the mailbox are played back 140. If another key is pressed during playback 140 of either a common or a mailbox message, that message is assigned or transferred to the mailbox for which a key has been pressed during playback 143. This allows the forwarding of messages from either the common area or a specific mailbox to another mailbox. Two, or more, mailboxes may have a message that is being played back assigned to them. All the user has to do is press the buttons corresponding to those mailboxes. When message playback 140 is complete, the DTAD 10 returns to its idle mode 112.

Figure 6:
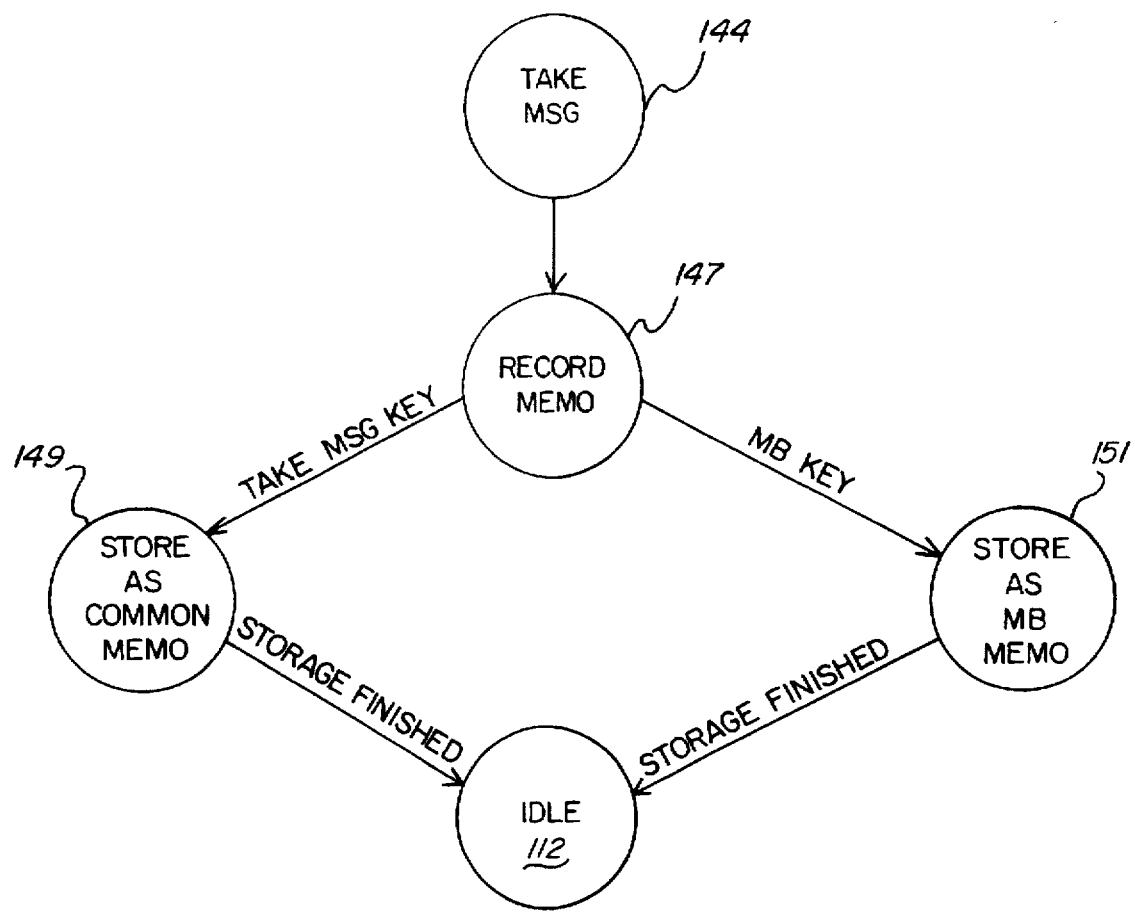
FIG. 6 is a state diagram for the take message operation of the present invention.

The DTAD 10 has the ability to record messages from a user local to the DTAD 10. When such a message is to be recorded, the TAKE MESSAGE key is pressed to activate the take message mode 144. FIG. 6 is a state diagram showing in greater detail the operation of the take messages mode 144.

When no telephone call is coming into the DTAD 10, a user local to the DTAD 10 can leave a message or memo for any or all persons using the DTAD 10. The user may press the TAKE MESSAGES key and begin speaking into the built-in microphone 34. The user's message will then be recorded by the DTAD 10 in a manner similar to its typical call recording 147. If the user does not press a mailbox key, the user's memo is recorded in the common message area 149. If the user does press a mailbox key, the memo is assigned to one of the mailboxes for later retrieval 151. The person to whom the mailbox corresponds can later retrieve the memo. Two or more mailboxes may have the same memo assigned to them.

When either the telephone handset or the speakerphone are used, the telephone mode 124 is engaged. The handset or the speakerphone operate in basically the same way so that in describing the operations and function changes for one predominately describes the operations and function changes for the other. Use of the DTAD 10 may be transferred from the speakerphone to the handset by lifting up the handset and taking it from its cradle. In order to use the speakerphone when the handset has already been removed from its cradle, a speakerphone activation button may be pressed while the handset is off-hook and subsequently replacing the handset into its cradle. By lifting the handset or switching on the speakerphone, the DTAD 10 is taken off-hook and usually a dial tone is heard through the device used.

Using the handset for exemplary purposes, calls may be answered by lifting the handset. The caller may be placed on hold by pressing a HOLD button. The caller may be removed from hold by pressing the HOLD button again, lifting the handset from its cradle, or by activating the speakerphone.

In order to automatically dial a telephone number that has been previously stored 128, an auto-dial button or code is pressed, followed by the button or code corresponding to the desired telephone number. Similarly, a single button may correspond to a single stored telephone number and that button may be pressed in order to dial the associated telephone number. When the appropriate sequence has been performed, the auto-dial function of the DTAD 10 is performed.

Whenever a number is dialed, either automatically or manually, there are occasions when it is desirable to dial the number again. In order to redial the number, the owner/user could dial the number again, but for convenience, a REDIAL button is provided that when pressed, dials again the number just previously called by the owner/user. If the call should go through, the DTAD 10 is used through the handset or the speakerphone in order to converse with the called party.

If the call does not go through, a busy redial function continues to dial and redial the number until a certain number of attempts have been made or until the called telephone is answered. If the call is successful, the handset or the speakerphone is used to converse with the called party. If after a pre-determined number of attempts the call does not go through, or if the DTAD 10 goes on-hook as when the handset is replaced in the cradle or the speakerphone is switched off, the DTAD 10 returns to its idle mode 112. Other known features for telephones may be incorporated into the present invention.

From the telephone mode 124 of the DTAD 10, the TAKE MESSAGES can be used to help the DTAD 10 perform an additional function. Sometimes, a person will answer an incoming call and the caller wishes to leave a message for another person who is absent. By pressing the TAKE MESSAGES key, the DTAD 10 may be activated to take the message for the absent party without having the person answering the call run to get pen and paper.

By pressing the TAKE MESSAGES key during an ongoing telephone call, the local user activates the DTAD 10 so that the caller can leave a message on the DTAD 10 while the person who answered the call can hang up the handset. If no mailbox key is subsequently pressed, the message is stored in the common message area 154. If a mailbox key is subsequently pressed after the TAKE MESSAGES key is pressed, the message subsequently recorded is assigned to that particular mailbox 156. As set forth in more detail below, the call is then recorded without an outgoing message. After the message has been recorded, the DTAD 10 returns to its idle mode 112.

If the call is answered by a user local to the DTAD 10, calls previously recorded in the common or mailbox message areas can be played back to the caller over the telephone line. Once activated, the local user may hang up the handset or speakerphone.

To transmit recorded messages to the caller, the local user presses the DELIVER MESSAGES key on the DTAD 10 during the telephone call. If the DELIVER MESSAGES key is followed by a mailbox key, the messages recorded in that mailbox are played back to the caller 158. When the local user goes on hook by replacing the handset in the cradle or the like, the DTAD 10 maintains the connection with the caller and engages in remote playback of the mailbox messages 160. If no mailbox key is pressed after the DELIVER MESSAGES key is pressed, the messages in the common message area are played back to the caller 162. When the local user hangs up the telephone and goes on hook, the DTAD 10 engages in remote playback of the common messages 164.

The message record and retrieve function 120 allows an owner/user to access the messages stored in the individual mailboxes from a remote location, typically using a touch-tone (DTMF) telephone.

When the DTAD 10 is in idle mode 112, along with other, related functions, the DTAD 10 is also able to receive incoming telephone calls and record messages from the callers. Incoming telephone calls may also be received by the DTAD 10 for the purposes of playing back recorded incoming messages or to otherwise control, alter, or adjust the functioning of the DTAD 10.

When a person (including the owner/user of the DTAD 10) calls, the DTAD 10 answers the incoming call after a certain number of rings has occurred in order to give other persons in the household an opportunity to pick up a telephone handset or otherwise answer the telephone call. If no one answers the call, the telephone line continues to ring until the DTAD 10 picks up the telephone and itself answers the call.

When the DTAD 10 picks up and answers the call, it plays to the incoming telephone caller a common, outgoing greeting message (OGM) 210. This outgoing greeting message would normally correspond to the OGM for the common OGM stored in memory. During the playback of the initial OGM 210, several options are available to the caller.

If the caller so desires, the initial OGM can be skipped and the caller's message immediately recorded in a memory heap of common incoming messages or in one of the mailboxes. To skip the initial OGM, the caller can push or punch a transfer code that can be announced to the caller during the initial playback of the OGM. Otherwise, after the OGM has ended, the caller may then record a message in the common message area 214.

If after the caller records a message in the common memory heap 214 or in a mailbox 222, the caller wants to record a second message, a pre-determined DTMF code (such as the tone for the button with numeral five for example) can be pressed to return the TAD to the initial OGM playback state 210.

From the initial OGM playback state 210, the caller is also able to record incoming messages within the individual mailboxes present in the DTAD 10. In order to prepare the DTAD 10 and to indicate in which mailbox the incoming message is to be stored, the caller can press the number on the DTMF keypad that corresponds to that mailbox. The OGM for that mailbox can be played back for the caller 218 and an opportunity made for the caller to leave a message in the particular mailbox 222. If during the playback of the selected mailbox's OGM a transfer tone is transmitted by the caller, the OGM is skipped and the caller's message is recorded immediately for storage in the selected mailbox 222. If another tone (such as the tone for keypad button five) is transmitted by the caller, operation of the DTAD 10 can be transferred back to the common OGM 210 so that the caller can leave a common or mailbox message.

If the DTAD 10 is able to recognize either distinctive rings or able to recognize the telephone number of the caller (caller id), playback of individual mailbox OGMs 218 can be associated with certain distinctive ringing patterns or certain incoming telephone numbers. Once engaged, the playback of mailbox OGMs 218 proceeds in a manner similar to typical call answering by the DTAD 10.

For incoming messages of both the common message area and the individual mailbox areas, the DTAD 10 returns to the idle mode 112 after five minutes have passed or if there has been no signal over the incoming telephone line for a pre-determined period of time (VOX activation).

If the caller is also an owner/user of the DTAD 10, that person will be aware of the unique remote code previously set 136 for the DTAD 10. If so, the unique remote tone code can be entered by the owner/user during the playback of the common OGM 210. The remote tone code may be preceded by a prefix such as the asterisk or star key on the typical DTMF keypad. Upon adequate reception of the remote tone code, including any prefix or suffix, remote access to the functions and features of the DTAD 10 are made available to the owner/user caller 226. Remote access 226 to the functions and features of the DTAD 10 may also be obtained in the same manner from the initial or default incoming message recording 214, the playback of particular mailbox OGMs 218, or from the recording of an incoming message for a certain mailbox 222.

Figure 7:
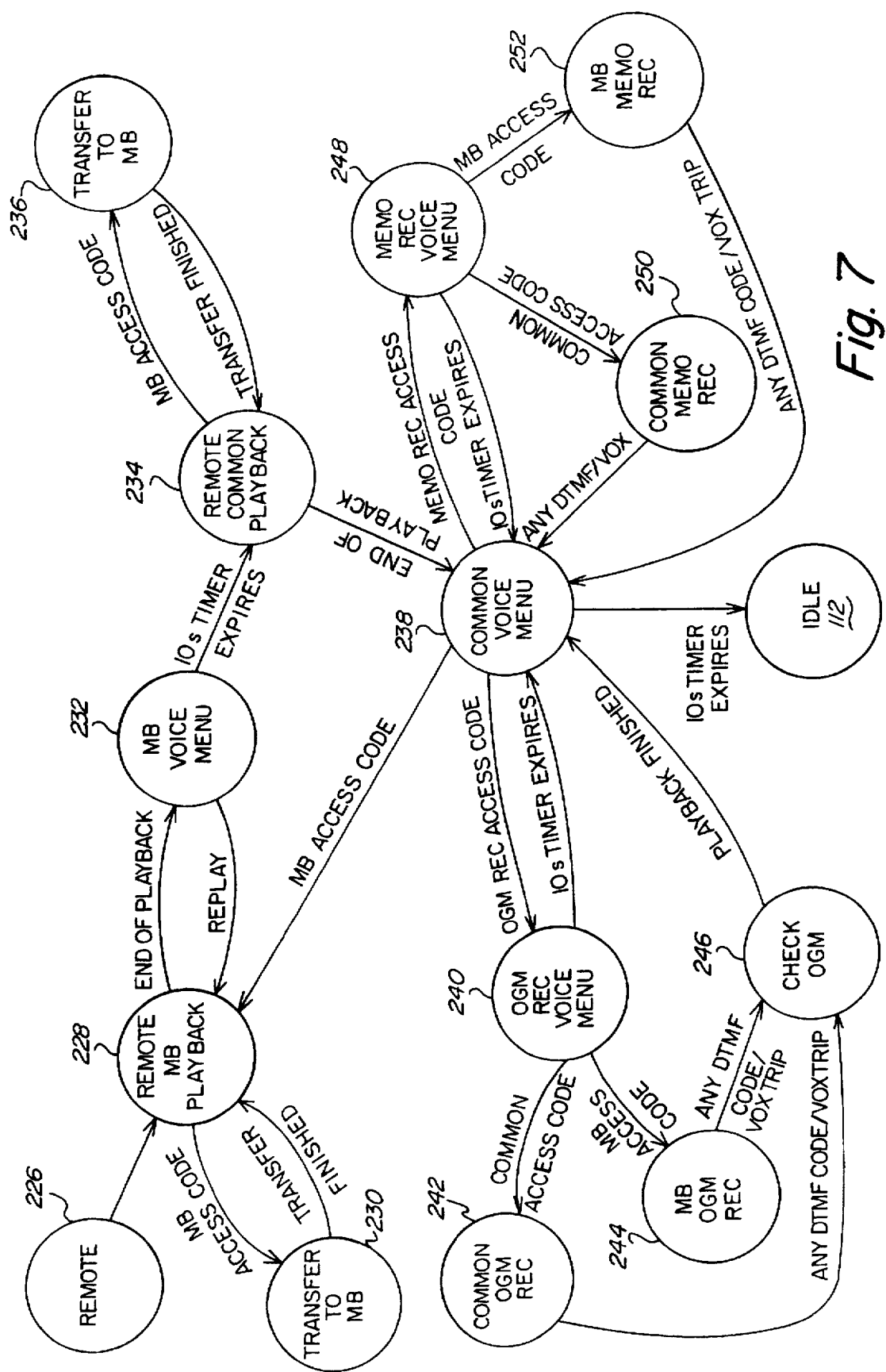
FIG. 7 is a state diagram of the remote operations for the present invention.

The remote mode 226 of the DTAD 10 is shown in greater detail in FIG. 7. Upon entry into the remote mode 226, remote mailbox playback to the caller is enabled 228 and messages for a particular mailbox will be played back to the caller. If the caller wants to transfer a certain message to another mailbox, entry by the caller of a mailbox access code will transfer the message currently playing or just played back to another mailbox 230. When the message transfer to the second mailbox is complete, the DTAD 10 returns to the mailbox playback mode 228 where another message can be specified for playback or another mailbox selected for message playback.

Once the user is finished with the remote mailbox playback mode 228, the DTAD 10 engages a voice menu for the mailbox message area 232 and verbal instructions are delivered by the DTAD 10 to the caller. If the caller desires to replay any mailbox messages, the remote mailbox playback mode 228 can be reengaged by transmitting a pre-defined access or instructional code. Otherwise, if the caller does not respond within a pre-determined amount of time (such as ten seconds), the DTAD 10 engages the remote common playback mode 234 and begins to playback the incoming messages stored in the common message area.

As for the remote mailbox message playback 228, if during the playback of the messages stored in the common area the caller desires to send one of the common messages to a mailbox, the caller enters the access code for the particular mailbox. The common message is then assigned to the mailbox 236 and the DTAD 10 returns to the remote common message playback mode 234.

When the common messages have been played back to the caller 234, the DTAD 10 engages a common voice menu 238. The common voice menu 238 delivers instructions and options to the caller over the telephone line so that the caller can choose one. If no choice is made after a pre-determined amount of time (such as ten seconds), the DTAD 10 returns to its idle mode 112. If the caller chooses to return to the remote mailbox message playback mode 228, the caller enters the appropriate code and the remote mailbox playback mode 228 is engaged.

If the caller wants to change an outgoing message (OGM), the caller enters an outgoing message record instruction code. The DTAD 10 then engages an OGM record voice menu 240 that informs the caller of the options available and relevant instructions at that point. If after a pre-determined amount of time (such as ten seconds) the caller has made no choice, the DTAD 10 returns to the common voice menu 238.

From the OGM record voice menu, the caller may either record a new common OGM 242 or a mailbox OGM 244. Each of these OGM modes has its own instruction code. The caller enters the appropriate access code for the common OGM or for the particular mailbox OGM and then records the new OGM by speaking clearly into the telephone. The OGM recording is terminated by falling silent for a pre-determined amount of time so that VOX activation will detect the end of the message or the caller may enter a tone to signify the end of the OGM recording. When the OGM is completed, it is checked by the caller through the check OGM mode 246. The new OGM is then played back to the caller and the DTAD 10 reengages the common voice menu 238.

If the caller wants to record a memo, the caller enters a memo record instruction code in response to the common voice menu 238. The DTAD 10 engages a memo record voice menu 248 which delivers options and instructions to the caller. If the caller chooses to record a memo for the common area, the caller enters a common instruction code. The caller then speaks clearly into the telephone to record the common memo 250. To end the common memo, the caller falls silent or enters a tone (as for remote OGM recording). If the caller chooses to record a memo for a particular mailbox, the caller enters a mailbox access code. The caller speaks clearly into the telephone to record the mailbox memo 252. By falling silent or entering a tone, the caller terminates the memo recording.

After the memo has been recorded, the DTAD 10 returns to the common voice menu 238. From the common voice menu 238, the DTAD 10 can engage the idle mode 112 in order to handle the next incoming telephone call or other task.

Figure 8:
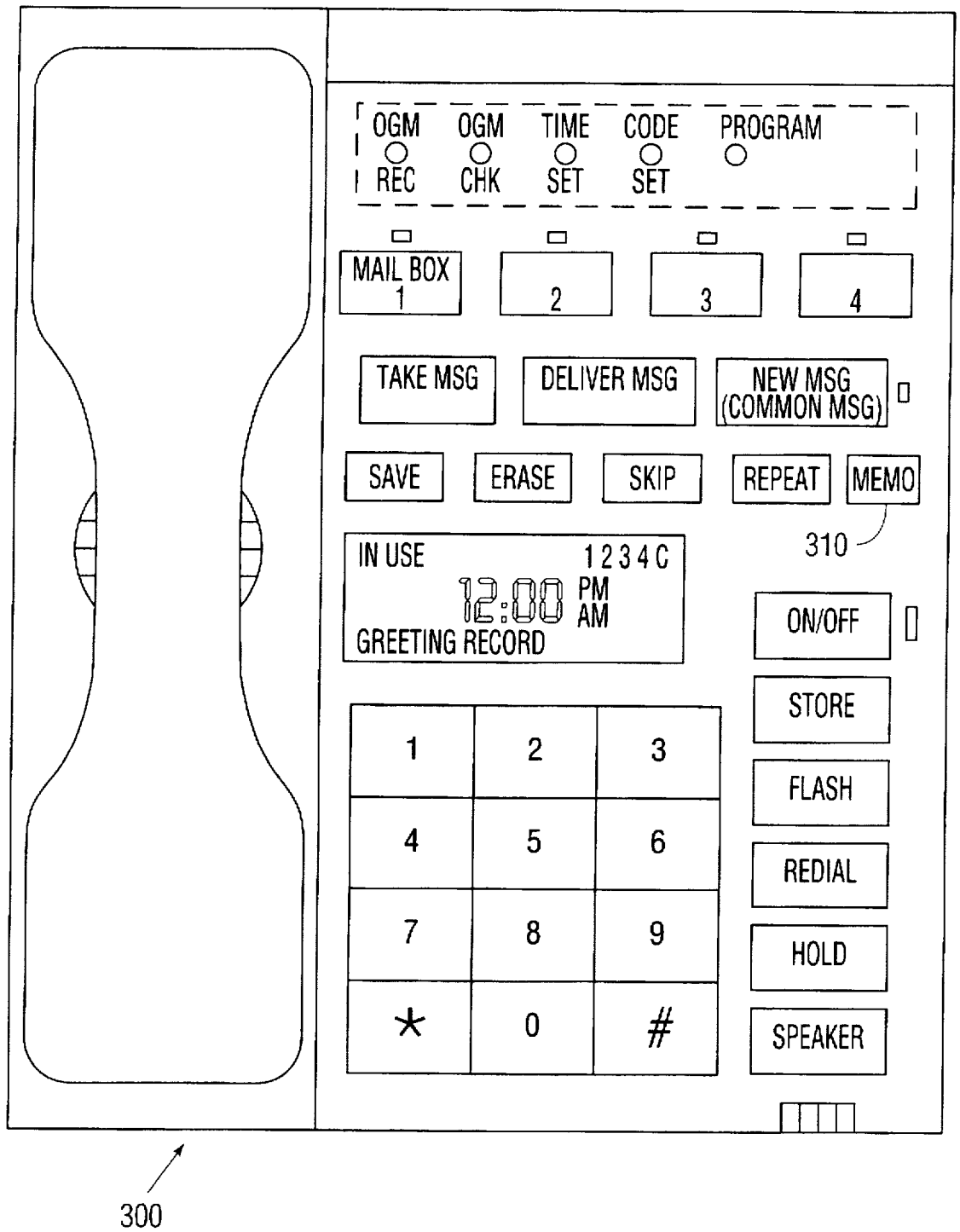
FIG. 8 is plan view of an alternative keyboard that could be used in conjunction with the present invention.
Figure 9:
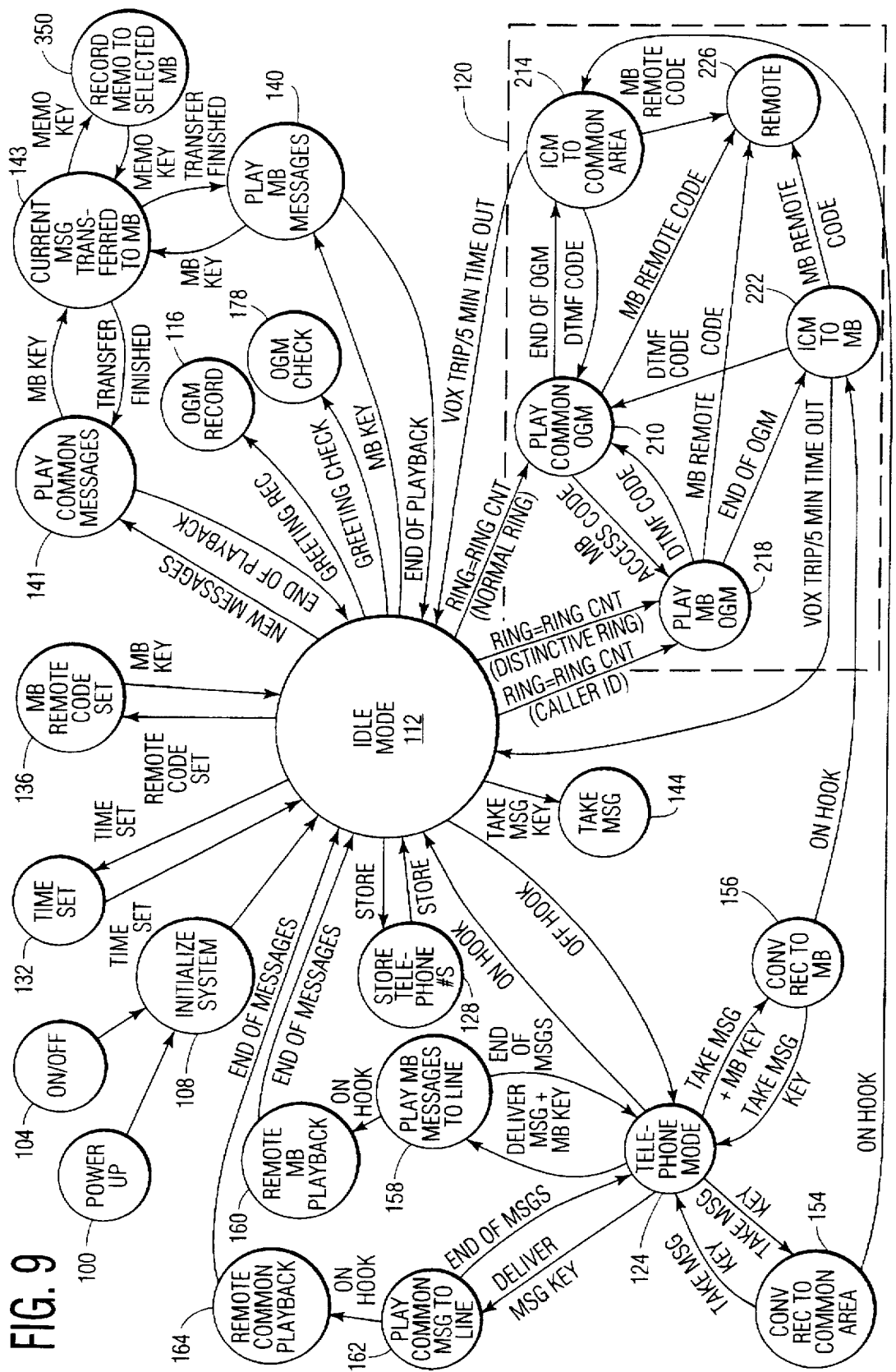
FIG. 9 is a state diagram for an alternative operation of the present invention.
Figure 10:
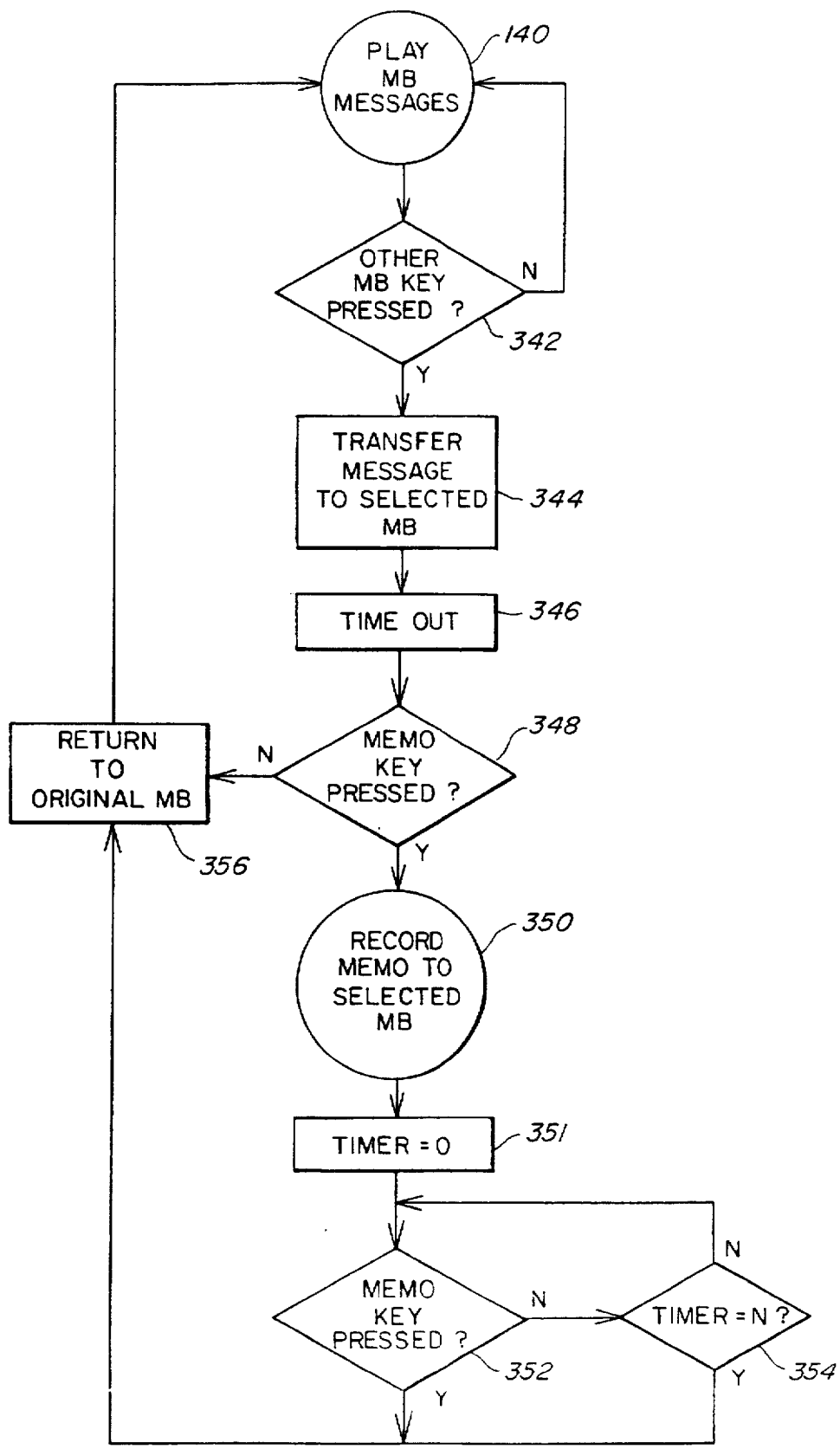
FIG. 10 is a flow diagram for the memo appending operation of the present invention.

Referring now to FIGS. 8 through 10, FIG. 8 is an alternative DTAD 300 keyboard having a telephone handset and cradle. This DTAD 300 keyboard operates in substantially the same manner as DTAD 10 keyboard described hereinabove in connection with FIG. 3 with the addition of a MEMO key 310. The MEMO key 310 allows a local user of the DTAD 300 to record a memo (or message) for other DTAD users. As will be explained in more detail below, the MEMO key 310 also permits the local user of the DTAD 300 to append a memo to a message after the message is transferred from one mailbox to another.

FIG. 9. is an alternative form of the state diagram shown in FIG. 4. The state diagram in FIG. 9 is substantially identical to that of the state diagram described hereinabove in connection with FIG. 4 with the addition of the memo record mode 350. If a local user presses the MEMO key 310 after transferring a current message to another mailbox 143, the DTAD 300 enters a memo record mode 350. The local user can then record a memo that will be appended directly behind (i.e., following) the transferred message. When the local user is finished recording the memo, the MEMO key 310 is pressed again and the DTAD 300 returns to the first mailbox and continues to play additional messages (if any have been recorded). When the user of the other mailbox replays his messages 140, he will hear the original message that was transferred to his mailbox followed by the appended memo.

FIG. 10 is a flow diagram for the memo appending mode of the present invention. Preferably, a local user enters the play mailbox messages mode by pressing the mailbox key on the DTAD 300 that corresponds to a particular mailbox (step 140). If, at any time during message playback, another mailbox key is pressed (yes in step 342), that message is transferred to the other selected mailbox (step 344). If no other mailbox key is pressed during message playback (no in step 342), the DTAD 300 continues to play messages recorded in the current mailbox (step 140). After a message has been transferred from the current mailbox to another selected mailbox (step 344), the DTAD 300 waits a predetermined length of time to see if the MEMO key is pressed (step 346). If the MEMO key is not pressed (no in step 348), the DTAD 300 returns to the original mailbox (step 356) and continues to play any additional messages, if any (step 140). If the MEMO key is pressed (yes in step 348), the DTAD 300 enters the memo record mode (step 350). The local user can now record a memo that will be appended directly behind (i.e., following) the message that was just transferred.

When the user enters the memo record mode (step 350), a timer is started from 0 seconds (step 351). The DTAD 300 now waits for either the MEMO key 310 to be pressed again (step 352) or for the timer to equal N seconds, where N is a predetermined length of time (step 354). If the MEMO key is pressed (yes in step 352), indicating that the local user has finished recording his or her memo, the DTAD 300 returns to the original mailbox (step 356) where it continues to play any additional messages (step 140). If the MEMO key is not pressed (no in step 352), the DTAD 300 checks to see if the timer is equal to N seconds (step 354). If the timer is not equal to N seconds (no in step 354), the DTAD 300 stays in the memo record mode and returns to step 352. If the timer equals N seconds (yes in step 354), indicating that the local user has either exceeded the amount of time allocated for recording a memo or has forgotten to press the MEMO key, the DTAD 300 returns to the original mailbox (step 356) where it continues to play any additional messages (step 140).

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A telephone answering device (TAD), comprising:

a controller including means for performing operations of the TAD in response to instructions stored in a memory;

a speech digitizer coupled to said controller for converting voice messages into digital representations of the voice messages;

memory means coupled to said controller and to said speech digitizer for storing digital data;

means for distinguishing between identified and unidentified voice messages;

said controller including means for storing both identified and unidentified voice messages in said memory means, said unidentified voice messages being stored in a common area;

logical assignment means for producing data indicating a logical assignment of respective identified stored voice messages to said memory means; and means for responding to and recording a caller's incoming message, said responding to and recording means activated by a user local to the TAD who has established a connection with said caller, said local user able to then disconnect the previously established connection with said caller while said TAD establishes and maintains a second connection with said caller so that said TAD responds to said caller and records a message of said caller.

2. A telephone answering device (TAD), comprising:

a controller including means for performing operations of the TAD in response to instructions stored in a memory;

a speech digitizer coupled to said controller for converting voice messages into digital representations of the voice messages;

memory means coupled to said controller and to said speech digitizer for storing digital data;

means for distinguishing between identified and unidentified voice messages;

said controller including means for storing both identified and unidentified voice messages in said memory means, said unidentified voice messages being stored in a common area;

logical assignment means for producing data indicating a logical assignment of respective identified stored voice messages to said memory means; and means for playing back messages previously recorded upon said TAD, said playback means activated by a user local to the TAD who has established a connection with a caller, said local user able to then disconnect the previously established connection with said caller while said TAD establishes and maintains a second connection with said caller so that said TAD responds to said caller and play back said messages previously recorded upon said TAD to said caller.

3. A digital telephone answering device (DTAD), comprising:

a controller including means for performing operations of the DTAD in response to instructions stored in a memory;

a speech digitizer coupled to said controller for converting voice messages into digital representations of the voice messages;

a random access memory (RAM) coupled to said controller and to said speech digitizer, said RAM being logically and dynamically divided into a common storage area and a plurality of mailbox storage areas by said controller, only said common storage area storing digital representations of voice messages produced by said speech digitizer;

manual assigning means for assigning messages in said common storage area to at least one of said plurality of mailbox storage areas; and memo recording means for allowing a local user to record a memo, said recorded memo being stored in said common storage area.

4. The digital telephone answering device (DTAD) as defined by claim 3, wherein the local user can append said recorded memo to a message following the assignation of said message to one of said plurality of mailbox storage areas by said manual assigning means.

5. The digital telephone answering device (DTAD) as defined by claim 3, wherein said manual assigning means comprises:

a plurality of user-operated keys, each user-operated key corresponding to one of said plurality of mailbox storage areas, said user-operated keys being coupled to said controller for manually assigning messages stored in said common storage area to a mailbox storage area while messages in said common storage area are being played back.

* * * * *